United States Patent
Pandey et al.

(10) Patent No.: US 8,693,532 B2
(45) Date of Patent: Apr. 8, 2014

(54) COMMUNICATIONS WITH ADAPTIVE EQUALIZATION

(75) Inventors: Sujan Pandey, Eindhoven (NL); Hubertus Gerardus Hendrikus Vermeulen, Eindhoven (NL); Abhijit Kumar Deb, Eindhoven (NL)

(73) Assignee: NXP B.V., Eindhoven (NL)

( * ) Notice: Subject to any disclaimer, the term of this patent is extended or adjusted under 35 U.S.C. 154(b) by 84 days.

(21) Appl. No.: 13/554,198

(22) Filed: Jul. 20, 2012

(65) Prior Publication Data

US 2014/0023132 A1 Jan. 23, 2014

(51) Int. Cl.
*H03H 7/30* (2006.01)

(52) U.S. Cl.
USPC ............ 375/232; 375/229; 375/230; 375/231

(58) Field of Classification Search
USPC ................................ 375/232, 229, 230, 231
See application file for complete search history.

(56) References Cited

U.S. PATENT DOCUMENTS

| | | | |
|---|---|---|---|
| 5,940,440 | A | 8/1999 | Werner et al. |
| 6,633,606 | B1 | 10/2003 | Oh |
| 7,170,931 | B2 | 1/2007 | Greiss et al. |
| 2002/0027953 | A1 | 3/2002 | Hwang et al. |
| 2004/0005001 | A1* | 1/2004 | Jones et al. ............ 375/232 |

OTHER PUBLICATIONS

Sato, "A Method of Self-Recovering Equalization for Multilevel Amplitude-Modulation Systems", IEEE Transactions on Communications, June 1975, p. 679-682.
Godard, "Self-Recovering Equalization and Carrier Tracking in Two-Dimensional Data Communication Systems", IEEE Transactions on Communications, vol. COM-28, No. 11, Nov. 1980, p. 1867-1875.
FlexRay Communications System Preliminary Central Bus Guardian Specification Version 2.0.9, Dec. 15, 2005, pp. 1-38.
FlexRay Communications System Protocol Specification Version 2.1 Revision E, Consortium internal release, Jun. 5, 2009, pp. 1-318.
FlexRay Communications System Protocol Specification Version 3.0.1, FlexRay Consortium, Oct. 2010, pp. 1-341.

* cited by examiner

*Primary Examiner* — Zewdu Kassa

(57) ABSTRACT

Signal equalization is facilitated in a manner that provides for feedback operation with desirable equalization operation. As consistent with one or more embodiments, a sign is assigned to received signals by generating an output that is an absolute value of the received signals, and a comparator processes the output and to generate a signal having a voltage level limited to a predetermined value. A sign of a signal output by an equalizer is detected and used to assign a sign to the output of the comparator. A summation circuit sums the output of the equalizer with the output of the comparator, and provides the sum to the equalizer as an error signal. The equalizer modifies a frequency component of received signals based on the error signal.

20 Claims, 5 Drawing Sheets

COMMUNICATIONS WITH ADAPTIVE EQUALIZATION

Aspects of various embodiments of the present invention are directed to communications, and specifically to apparatuses, systems and methods involving adaptive equalization.

When a discrete time signal is transmitted over a cable, the received signal will be a distorted form of the transmitted signal. This is a common phenomenon in a variety of applications such as high speed serial communication systems that are based on communications approaches such as USB and Ethernet. Since the medium acts as a low pass filter, it smears the shape of the transmitted pulse by attenuating the high frequency components, such that the sequence tails overlap with neighboring sequences. This can result in inter-symbol interference (ISI) due to the communication medium.

Various approaches to eliminating ISI from a received symbol involve the use of equalizers at the receiver. Such equalizers can be implemented as filters with an impulse response that is the inverse of the channel characteristics. As the impulse response of the channel does not remain constant and changes over time, adaptive filters are used in order to match the impulse responses that vary over time. In many communication systems, the channel impulse response is not known in advance. For instance, the length of a cable in an Ethernet network is not constant for all networks, in view of which equalizers are trained first to estimate the channel impulse response before transferring real data.

Attempts to address these issues and variances have been challenging to successfully implement. For instance, blind equalization algorithms have been implemented using binary decision devices to cope with multilevel pulse amplitude modulation (PAM) issues, and using high-order statistics to calculate a scaling factor. However, these approaches rely on the knowledge of the signal statistics at the input of the channel, and are susceptible to erroneous decision-making which can result in long convergence times. Furthermore, the signal statistics may not be constant for different applications. Other similar approaches require undesirably large circuit areas and involve high power consumption. These and other matters have presented challenges to data communications, for a variety of applications.

Various example embodiments are directed to communication circuits and their implementation. In accordance with various embodiments, an equalization approach uses blind-type equalization, aspects of which may facilitate rapid convergence time and eye opening.

A more particular embodiment is directed to an apparatus having an equalizer circuit that modifies a frequency component of received signals based on an error signal. An absolute value circuit assigns a sign to each received signal by generating an output that is an absolute value of the received signal. A comparator processes each signal output from the absolute value circuit, to generate a signal having a voltage level limited to a predetermined value. A sign detection circuit detects a sign of signals output by the equalizer circuit, and assigns a sign to the output of the comparator circuit based upon the detected sign. A summation circuit sums the output of the equalizer with the output of the comparator circuit having the sign assigned thereto (e.g., by adding values of different signs to determine a difference therebetween), and provides the sum to the equalizer as the error signal.

The above approach can be implemented in analog and/or digital form. In some implementations involving digital processing, the absolute value circuit includes a logic circuit and/or circuit such as a ground circuit, that assigns a sign bit to the received signals by replacing sign bits having a value of "1" with bits having a value of "0." The comparator is implemented using a slicer that slices signals received from the logic circuit. The sign detection circuit operates by detecting a sign bit of the signal output by the equalizer circuit. This approach can be implemented, for example, with a two's complement representation and a receiver having an analog-to-digital converter (ADC) (i.e., with the two's complement of an n-bit number being the complement with respect to $2^n$, and being the effective negative of an original number).

Another example embodiment is directed to a method for equalizing signals received over a channel. For each of a plurality of signals received on the communication channel and presented to an equalizer, a sign is assigned to the signal by generating an output signal that is an absolute value of the received signal. The generated signal is processed to provide a level-limited signal having a voltage level limited to a predetermined value. A sign of a signal output by the equalizer is detected and used to assign a sign to the level-limited signal. The output of the equalizer is summed with the level-limited signal having the sign assigned thereto, and the sum is provided as an error signal. The equalizer uses the error signal to modify a frequency component of a received signal.

The above discussion/summary is not intended to describe each embodiment or every implementation of the present disclosure. The figures and detailed description that follow also exemplify various embodiments.

Various example embodiments may be more completely understood in consideration of the following detailed description in connection with the accompanying drawings, in which.

Figure 1:
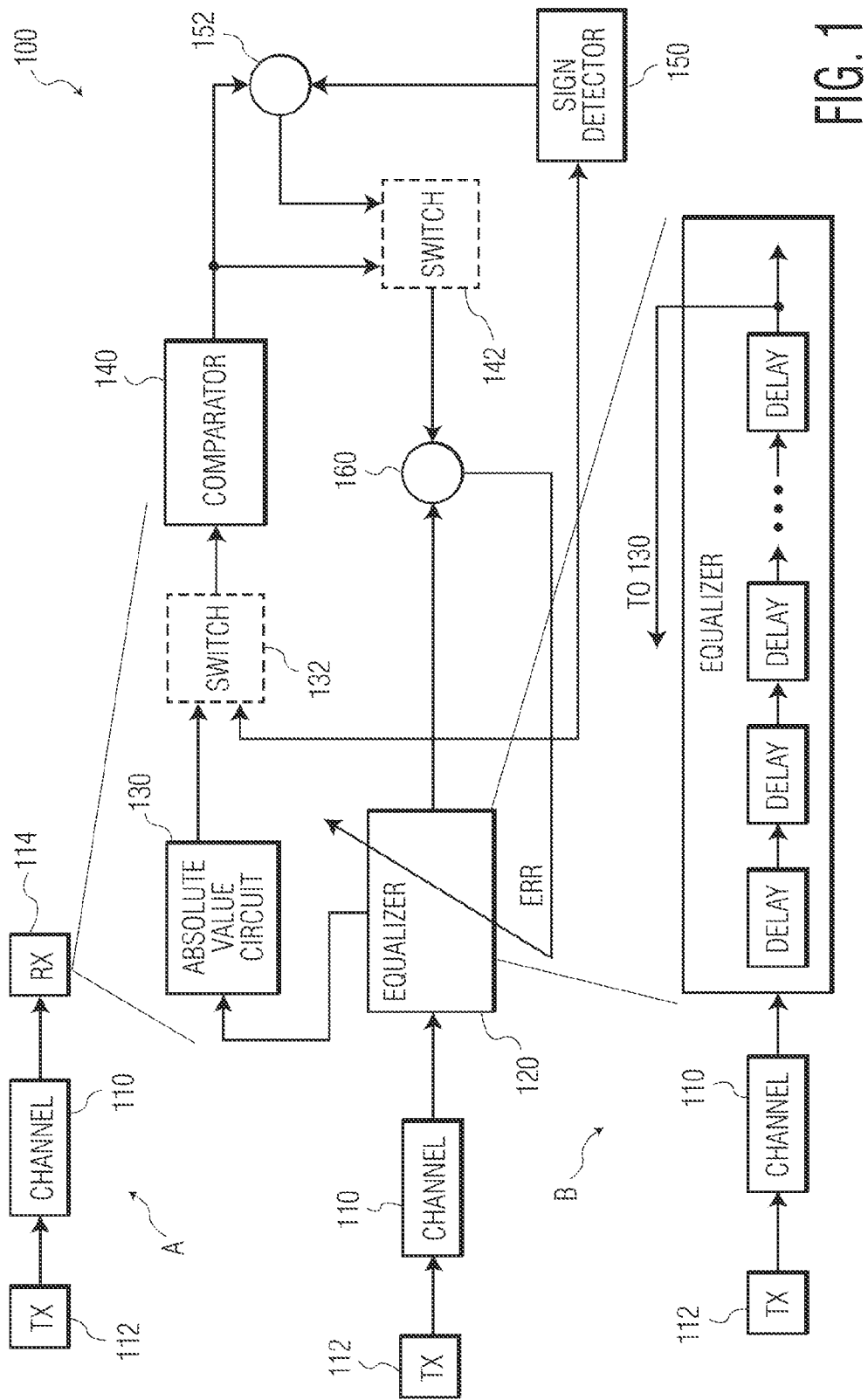
FIG. 1 shows an apparatus for equalizing signals received over a channel, in accordance with one or more example embodiments of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention including aspects defined in the claims. In addition, the term "example" as used throughout this application is only by way of illustration, and not limitation.

Aspects of the present invention are believed to be applicable to a variety of different types of apparatuses, systems and methods involving communications with adaptive equalization. While the present invention is not necessarily so limited, various aspects of the invention may be appreciated through a discussion of examples using this context.

In accordance with one or more example embodiments, blind adaptive equalization is implemented using adaptive slicing with fast convergence and eye opening, in one or more of apparatus, system and method-based approaches. In other embodiments, a decision-directed adaptive equalization circuit estimates channel impulse response and implements decision-directed adaptive equalization. The output of an equalizer in the circuit is correlated with the equalizer input and used to facilitate fast filter coefficient convergence time and fast eye opening (and, e.g., less bit-error-rate (BER)). Such approaches can be implemented with serial communications, and with automotive Ethernet communications. Moreover, these approaches can be implemented independently from channel data statistics, can reduce the probability of taking a wrong decision, and can be carried out without oversampling and therein conserve power.

In a more particular example embodiment, it has been discovered that, by correlating the output of an equalizer with its input, coefficient convergence time can be improved, as can opening of an eye diagram for the signal. Accordingly, a communication circuit operates as follows. A sign bit (in a digital realm) corresponding to a signal received over a channel is detected; if the sign bit is equal to one, the sign bit is forced to 0. If the sign bit is 0, the received signal is provided to a comparator (e.g., a slicer), the output of which is multiplied by the sign output of the equalizer. The product of this multiplication is added with an output of the equalizer, and the resulting sum is used to provide an error signal to the equalizer for equalizing received signals.

In some implementations, one or more multiplexers are connected to facilitate the operation of the communication circuit in blind and decision-directed modes, in which the blind mode involves operation as discussed above and in which the decision-directed mode involves the use of direct outputs of the equalizer into the comparator. Accordingly, a first multiplexer is used to select between the output of the equalizer for the decision-directed mode, and the input of the equalizer. A second multiplexer selectively couples the output of the comparator directly for the summation as above for the decision-directed mode, and couples the product of the aforesaid multiplication of the comparator output and the sign output of the equalizer for the summation in the blind mode.

With respect to various embodiments, a blind operation mode is carried out using an input signal as received prior to processing by an equalizer, to generate a level-limited (e.g., sliced) signal, which is in turn used to provide an error signal to the equalizer. In certain embodiments, such a blind operation mode is accompanied by a decision-directed mode in which an actual output of the equalizer is used to generate the level-limited signal and, therein, provide feedback to the equalizer. The respective modes may be carried out at different times, to suit various applications.

Turning now to the Figures, FIG. 1 shows an apparatus 100 for equalizing signals, as received at a receiver 114 (as shown in inset A), from a transmitter 112 over a channel 110, in accordance with one or more example embodiments of the present invention. The signals may include one of a variety of types of signals, such as a signal from a binary, pulsed amplifier, or multi-level signal transmitter. The communication links made with the channel 110 may include, for example, a single plain wire for transmission and reception and a recognition unit being implemented to detect a signal for reception.

The apparatus 100 includes an equalizer 120, an absolute value circuit 130, a comparator 140, a sign detector 150, a multiplier 152 and a summation circuit 160. The absolute value circuit 130 provides an absolute value output of a signal provided via the channel 110 to the comparator 140, which further processes the signal to provide a voltage-limited output thereof. The sign detector 150 detects the sign of an output of the equalizer and provides an output indicative of the detected sign to the multiplier 152, which multiplies the output of the comparator 140 by the sign. This multiplied output is provided to a summation circuit 160, which adds an output of the equalizer 120 thereto and provides the sum to the equalizer as an error feedback signal.

The equalizer operates to modify a frequency component of received signals based on the error feedback signal. Inset B shows an example implementation of the equalizer circuit, in which the received signal is provided to the absolute value circuit after a certain delay.

In some implementations, a first switching circuit 132 selectively provides one of an output of the absolute value circuit 130 and an output of the equalizer 120 to the comparator 140, in response to a first control signal. A second switching circuit 142 selectively provides one of an output of the comparator 140 and an output of sign detector 150 to the summation circuit 160, in response to a second control signal. These signals may be provided, for example, using a control circuit such as control circuit 280 shown in and described in connection with FIG. 2 below. In one implementation, the first and second control signals are concurrently applied for operating the apparatus in a blind operation mode, with the switching circuits 132 and 142 operating in a decision-directed mode in the absence of the first and second signals.

The apparatus shown in FIG. 1 is implemented in a variety of manners to suit various embodiments. Such operation may involve digital and/or analog operation, which may further involve an analog-to-digital converter (ADC) or a digital-to-analog converter (DAC), which may be implemented as part of the circuits shown. In accordance with one or more such embodiments, the absolute value circuit 130 includes a circuit that computes the absolute value of the received symbol. In some implementations, the absolute value circuit 130 includes a logic circuit that assigns a sign bit to the received signals by replacing sign bits having a value of "1" with a bit having a value of "0". The comparator 140 is implemented using a slicer that slices signals received from the logic circuit. The sign detector 150 operates by detecting a sign bit of the signal output by the equalizer circuit.

Figure 2:
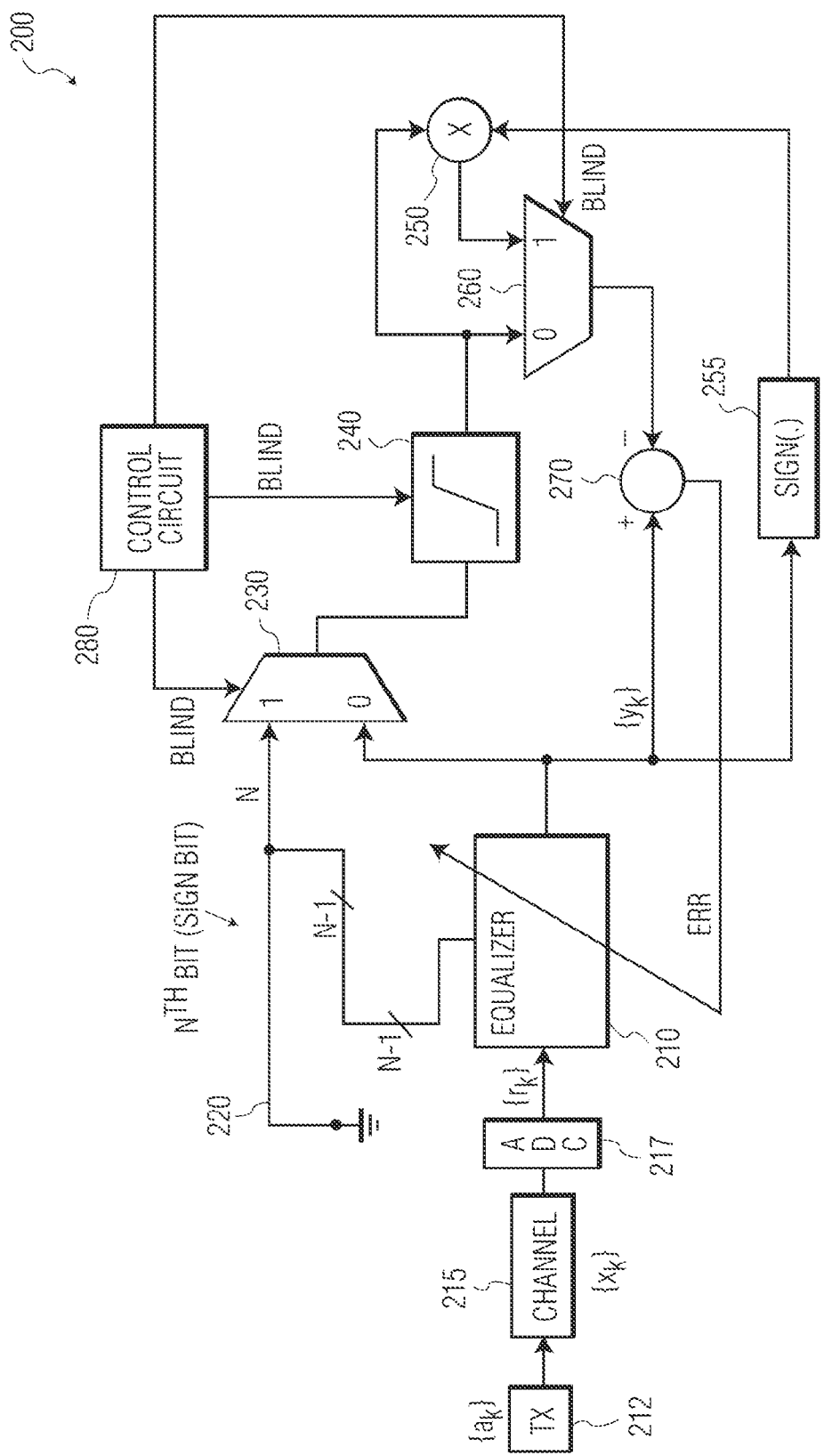
FIG. 2 shows a blind equalization circuit and related approach, in accordance with various example embodiments of the present invention.

FIG. 2 shows a blind equalization circuit 200 and related approach, in accordance with various example embodiments. The circuit 200 includes an equalizer 210 that receives an incoming signal $\{a_k\}$ from a transmitter 212 on a channel 215, as converted by an ADC 217, with the output of the channel $\{r_k\}$ being provided as an input to the equalizer, and with the output of the equalizer being $\{y_k\}$. A ground circuit 220 provides an output to a multiplexer 230 to set the sign bit of the signal to "0" if the value of the sign bit is "1" for a 2's complement number. The output $\{y_k\}$ of the equalizer 210 is also connected to an input of the multiplexer 230. The output of the multiplexer 230 is connected to a slicer 240 (which may be implemented as a comparator), the output of which is respectively coupled to a multiplier 250 and to a multiplexer 260. In some implementations, the multiplier 250 is implemented as a logic circuit that copies the sign of the equalizer output $\{y_k\}$ from a sign bit detection circuit 255 to the sign bit of the output of the slicer 240. The sum of the multiplication is connected to another input of multiplexer 260. The output of multiplexer 250 is connected to an adder 270, which is also connected to receive the output $\{y_k\}$ of the equalizer 210.

In a blind operating mode, the multiplexer 230 operates to pass the input signal $\{r_k\}$ with the sign bit assigned via the ground circuit 220 to the slicer 240, and multiplexer 260 passes the product of the multiplier 250 to the adder 270, which in turn provides the sum to the equalizer 210 as an error signal. In a decision-directed mode, multiplexer 230 passes the output $\{y_k\}$ of the equalizer 210 to the slicer 240, and multiplexer 260 passes the output of the slicer 240 to the adder 270, bypassing ground circuit 220 and multiplier 250. In some embodiments, the circuit 200 includes a control circuit 280 that generates and provides signals to the multiplexer 230, slicer 240 and multiplexer 260 for controlling the operation thereof in blind or decision-directed modes.

The equalizer coefficients are implemented using one or more of a variety of approaches. In some embodiments, the weight (w) coefficients of the equalizer are as follows:

$$w_{k+1} = w_k - \mu \cdot r_k (y_k - bd(r_k) \cdot \text{sign}(y_k)), \quad (6)$$

where $\mu$ is a gain constant and the term $bd(r_k)$ is defined as $$bd(r_k) = z = |r_k| = \begin{cases} 1, & z > th \\ 0, & z \le th, \end{cases} \quad (7)$$

in which the term th is a threshold of the slicer 240, which depends on noise due to ISI (and can be programmable).

Figure 3:
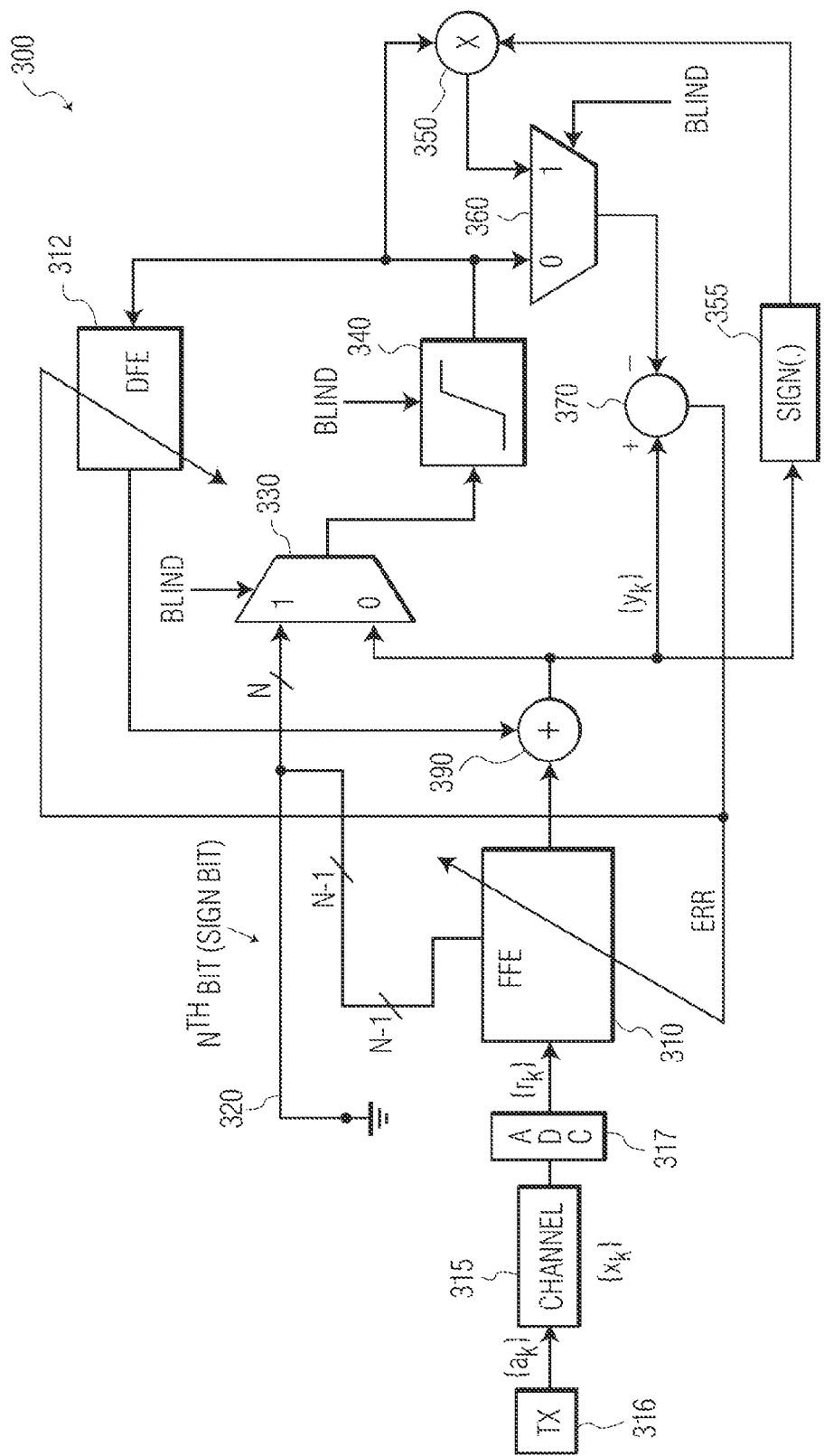
FIG. 3 shows another equalization apparatus, in accordance with another example embodiment of the present invention.

FIG. 3 shows another equalization apparatus 300, in accordance with another example embodiment of the present invention. The apparatus 300 may, for example, be implemented using approaches similar to that as shown in FIG. 2. Accordingly, various components shown in FIG. 3 are labeled with numerals that are similar to those as shown in FIG. 2 (e.g., ground circuit in FIG. 2 is labeled "220" whereas ground circuit in FIG. 3 is labeled "320").

The apparatus 300 includes a feed forward equalizer (FFE) 310 and a decision feedback equalizer (DFE) 312, which operate to equalize an incoming signal $\{r_k\}$ converted by an ADC 317 as received on a channel 315, via which signal $\{a_k\}$ is received from a transmitter 316. The output of the channel $\{r_k\}$ is provided as an input to the equalizer and, therefrom, to a ground circuit 320 having inputs connected to a voltage source $V_{dd}$ and the sign bit of $\{r_k\}$. The ground circuit 320 sets the sign bit of the signal $\{r_k\}$ as discussed herein, with the signal being provided as an input to multiplexer 330. Other embodiments employ different types of circuits in lieu of and/or in addition to ground circuit 320 for setting an absolute value of the signal $\{r_k\}$. The output of the multiplexer 330 is connected to an input of a slicer 340, the output of which is coupled to the DFE 312, multiplier 350 and multiplexer 360.

The outputs of the FFE and DFE are respectively provided to an adder 390, the output of which $\{y_k\}$ is provided to the multiplexer 330 and to each of a sign detector 355 and an adder 370, the latter of which is also coupled to receive the output of multiplexer 360. The sign detector 355 provides an output to multiplier 350, the product of which is provided to the multiplexer 360. The output of the multiplexer 360 is also coupled to the adder 370, with the sum of the multiplexer's output with $\{y_k\}$ being provided as an error signal to both of the FFE 310 and DFE 312.

In a blind operating mode, the multiplexer 330 operates to pass the input signal $\{r_k\}$ with the sign bit assigned via ground circuit 320 to the slicer 340, and multiplexer 360 passes the product of the multiplier 350 to the adder 370. In a decision-directed mode, multiplexer 330 passes the output $\{y_k\}$ of the adder 390 to the slicer 340, and multiplexer 360 passes the output of the slicer 340 to the adder 370, bypassing the ground circuit 320 and multiplier 350.

Figure 4:
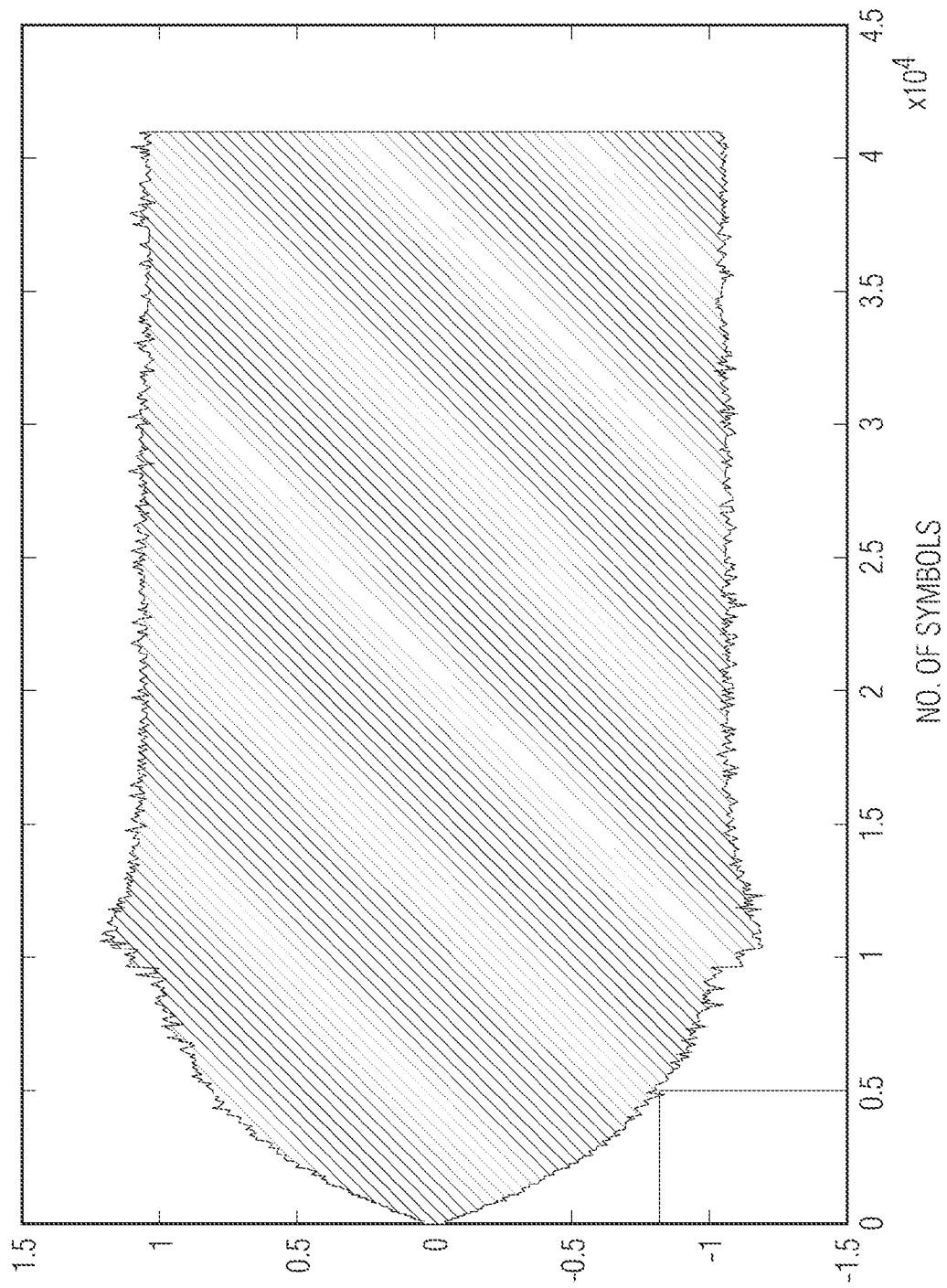
FIG. 4 shows a plot of equalizer coefficient convergence, in accordance with one or more example embodiments of the present invention.

FIG. 4 shows a plot of equalizer coefficient convergence, in accordance with one or more embodiments. As shown in the plots, the output of the equalizer has an amplitude close to −1.0, which can be beneficially obtained (e.g., relative to other approaches having an amplitude of about −0.5).

Figure 5:
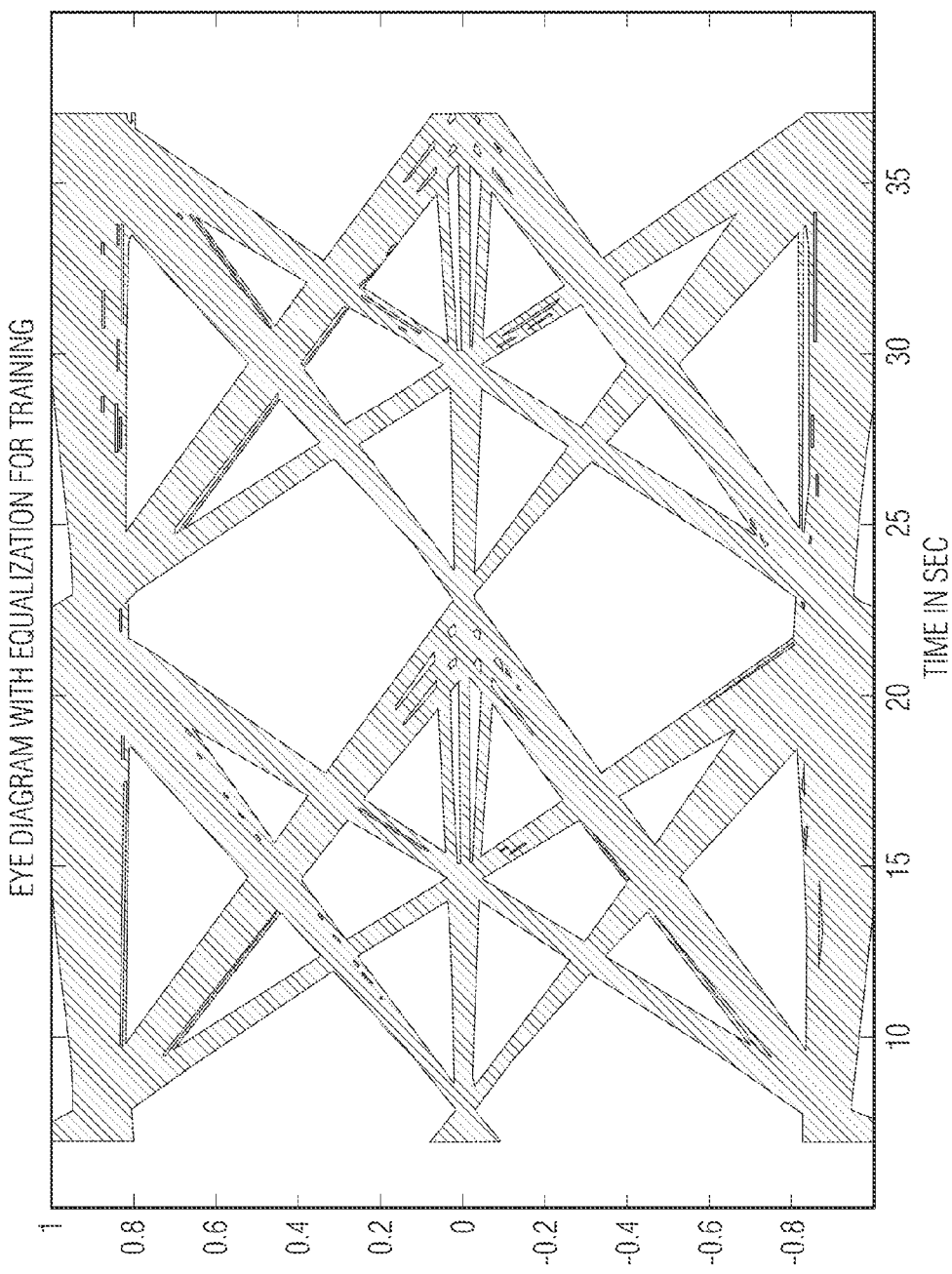
FIG. 5 shows an eye diagram with opening thereof for an equalization approach as carried out in accordance with one or more example embodiments of the present invention.

FIG. 5 shows an eye diagram with opening thereof for an equalization approach as carried out in accordance with one or more embodiments. The eye diagram in FIG. 5 is shown by way of example as corresponding to equalization convergence. In certain implementations such convergence may be effected, for example, using a relatively low number of symbols (e.g., 100 or less). The plots shown in FIGS. 4 and/or 5 may, for example, be obtained using approaches such as those shown in and described in connection with FIGS. 1, 2 and 3 above.

Other embodiments are directed to methods for equalizing signals, which may be implemented in connection with one or more of the figures shown herein. In one embodiment, equalization is carried out as follows for each of a plurality of signals received on a communication channel and presented to an equalizer. An absolute value of the received signal is processed to provide a level-limited signal having a voltage level limited to a predetermined value. The sign of a signal output by the equalizer is detected and assigned to the level-limited signal. The output of the equalizer is summed with the level-limited signal having the sign assigned thereto, and the sum is used by the equalizer to modify a frequency component of a received signal. These approaches may involve analog or digital approaches, such as described hereinabove with one or more figures.

Various embodiments are directed to the implementation of communications circuits and/or approaches as discussed hereinabove with in-vehicle network (IVN) transceiver products, for vehicle networks such as LIN, CAN, and FlexRay networks, as well as Ethernet-based networks (e.g., in accordance with IEEE 802 standards), telephone networks or digital subscriber line (DSL) networks. These communications may be implemented with wired (e.g., twisted pair, optical) and/or wireless communication links. For general information regarding vehicle network communications, and for specific information regarding communication protocols and circuitry in which one or more example embodiments may be applied, reference may be made to the LIN protocol specification version 2.2 available from the Lin administration of Munich, Germany; to the CAN 2.0 specification available from CAN in Automation (CiA) of Nuremberg, Germany; and to the "FlexRay Communications System Protocol Specification," ver 3.0 available from the FlexRay consortium, all of which are fully incorporated herein by reference.

For general information regarding equalization, and for specific information regarding circuitry and approaches that may be implemented in connection with one or more example embodiments herein, reference may be made to one or more of the following references, each of which is fully incorporated herein by reference: Yoichi Sato—*A method of self-recovering equalization for multilevel amplitude modulation*, IEEE Transactions on communications, June 1975; U.S. Pat. No. 5,940,440 to Werner et al.; U.S. Patent Publication No. 2002/0027953 to Hwang et al.; U.S. Pat. No. 6,633,606 to Ji-sung Oh; U.S. Pat. No. 7,170,931 to Gneiss et al.; and D. N. Godard—*Self recovering equalization and carrier tracking in two dimensional data communications systems*. IEEE Trans. Communication, vol. 28, no. 11, November 1980.

Based upon the above discussion and illustrations, those skilled in the art will readily recognize that various modifications and changes may be made to the present invention without strictly following the exemplary embodiments and applications illustrated and described herein. For example, one or more circuits in the above-cited references may be implemented in accordance with one or more example embodiments here (e.g., programmed and/or operated in accordance therewith). Such modifications do not depart from the true spirit and scope of the present invention, including that set forth in the following claims.

What is claimed is:

1. An apparatus comprising:
    an equalizer circuit configured and arranged to modify a frequency component of received signals based on an error signal;
    an absolute value circuit configured and arranged to assign a sign to each received signal by generating an output that is an absolute value of the received signal;
    a comparator circuit configured and arranged to, for each signal output from the absolute value circuit, process the signal to generate a signal having a voltage level limited to a predetermined value;
    a sign detection circuit configured and arranged to detect a sign of signals output by the equalizer circuit and to assign a sign to the output of the comparator circuit based upon the detected sign; and
    a summation circuit configured and arranged to sum the output of the equalizer with the output of the comparator circuit having the sign assigned thereto, and to provide the sum to the equalizer as the error signal.

2. The apparatus of claim 1, wherein the absolute value circuit is configured and arranged to assign a sign to the received signals by assigning a "0" sign bit to signals having a "1" sign bit.

3. The apparatus of claim 1, wherein the comparator circuit is a slicer circuit configured and arranged to slice the signal to generate the signal having said limited voltage level.

4. The apparatus of claim 1, further including
    a first switching circuit configured and arranged to selectively provide one of an output of the absolute value circuit and an output of the equalizer to the comparator circuit, in response to a first control signal; and
    a second switching circuit configured and arranged to selectively provide one of an output of the comparator circuit and an output of sign detection circuit to the summation circuit, in response to a second control signal.

5. The apparatus of claim 4, further comprising a control circuit configured and arranged to generate the first and second control signals and to concurrently apply the first and second control signals for operating the apparatus in a blind operation mode, wherein the first and second switching circuits operate in a decision-directed mode in absence of the first and second signals.

6. The apparatus of claim 1, wherein the sign detection circuit includes a multiplier circuit configured and arranged to assign the sign to the output of the comparator circuit based upon the detected sign.

7. The apparatus of claim 1, wherein at least one of the respective circuits is configured and arranged to operate on an analog signal.

8. The apparatus of claim 1, wherein at least one of the respective circuits is configured and arranged to operate on a digital signal.

9. The apparatus of claim 4, further including an analog-to-digital converter configured and arranged to convert an analog signal into a digital signal and to provide the digital signal for use by the at least one of the respective circuits configured and arranged to operate on a digital signal.

10. An apparatus comprising:
    an equalizer circuit configured and arranged to modify a frequency component of received signals based on an error signal;
    a sign circuit configured and arranged to replace sign bits having a value of "1" in the received signals with a sign bits having a value of "0";
    a slicer circuit connected to receive the signals having a sign bit assigned by the sign circuit, and configured and arranged to slice the received signals;
    a sign-bit detection circuit configured and arranged to detect a sign bit of a signal output by the equalizer circuit and to assign a sign bit to the output of the slicer circuit based upon the detected sign bit; and
    a summation circuit configured and arranged to sum the output of the equalizer with the output of the slicer circuit having the sign bit assigned thereto, and to provide the sum to the equalizer as the error signal.

11. The apparatus of claim 10, wherein the sign circuit includes a ground circuit configured and arranged to assign a "0" sign bit to the received signal.

12. The apparatus of claim 10, wherein the slicer circuit is connected to receive an output of the equalizer circuit, further including
    a first switching circuit configured and arranged to selectively provide, to the slicer circuit, one of the output of the equalizer and the received signal having the sign bit assigned by the sign circuit, in response to a first control signal; and
    a second switching circuit configured and arranged to selectively provide one of an output of the slicer circuit and an output of sign-bit detection circuit to the summation circuit, in response to a second control signal.

13. The apparatus of claim 12, further comprising a control circuit configured and arranged to operate the apparatus in a decision-directed mode and in a blind operation mode by providing the first and second control signals to,
    in the decision-directed mode, control the first switching circuit to provide the output of the equalizer to the slicer circuit, and control the second switching circuit to provide the output of the slicer circuit to the summation circuit, and
    in the blind operation mode, control the first switching circuit to provide the received signal having the assigned sign bit to the slicer circuit, and control the second switching circuit to provide the output of the sign-bit detection circuit to the summation circuit.

14. The apparatus of claim 10, wherein the sign-bit detection circuit includes a multiplier circuit configured and arranged to assign the sign bit to the output of the slicer circuit based upon the detected sign bit.

15. A method comprising, for each of a plurality of signals received on a communication channel and presented to an equalizer:
    assigning a sign to the signal by generating an output signal that is an absolute value of the received signal;
    processing the generated signal to provide a level-limited signal having a voltage level limited to a predetermined value;
    detecting a sign of a signal output by the equalizer and assigning a sign to the level-limited signal based upon the detected sign;
    summing the output of the equalizer with the level-limited signal having the sign assigned thereto, and providing the sum as an error signal; and
    in the equalizer, using the error signal to modify a frequency component of a received signal.

16. The method of claim 15, wherein assigning the sign includes assigning a "0" sign bit to signals having a "1" sign bit.

17. The method of claim 15, wherein processing the generated signal to provide a level-limited signal includes slicing the signal to generate the signal having said limited voltage level.

18. The method of claim 15, wherein processing the generated signal to provide a level-limited signal having a voltage level limited to a predetermined value, and summing the output of the equalizer with the level-limited signal having the sign assigned thereto are carried out in a blind operation mode, further including operating in a decision-directed mode by processing an output of the equalizer to provide a second level-limited signal having a voltage level limited to the predetermined value, and by summing the output of the equalizer with the level-limited signal.

19. The method of claim 15, wherein at least one of the respective operations is carried out upon an analog signal.

20. The method of claim 15, wherein at least one of the respective operations is carried out upon a digital signal, using an analog-to-digital converter to convert the received signal into a digital signal.

* * * * *